US012619260B2

(12) United States Patent
Feyzmahdavian et al.

(10) Patent No.: US 12,619,260 B2
(45) Date of Patent: May 5, 2026

(54) AUTO-DOCKING OF MARINE VESSELS

(71) Applicant: ABB Schweiz AG, Baden (CH)

(72) Inventors: Hamid Feyzmahdavian, Stockholm (SE); Shiva Sander Tavallaey, Solna (SE); Stefan Thorburn, Västerås (SE)

(73) Assignee: ABB Schweiz AG, Baden (CH)

( * ) Notice: Subject to any disclaimer, the term of this patent is extended or adjusted under 35 U.S.C. 154(b) by 138 days.

(21) Appl. No.: 18/418,971

(22) Filed: Jan. 22, 2024

(65) Prior Publication Data
US 2024/0310857 A1 Sep. 19, 2024

(30) Foreign Application Priority Data
Feb. 3, 2023 (EP) ..................................... 23154923

(51) Int. Cl.
*G05D 1/661* (2024.01)
*G05D 1/622* (2024.01)
*G05D 1/644* (2024.01)
*G05D 101/15* (2024.01)
*G05D 109/30* (2024.01)

(52) U.S. Cl.
CPC ............. *G05D 1/661* (2024.01); *G05D 1/622* (2024.01); *G05D 1/644* (2024.01); *G05D 2101/15* (2024.01); *G05D 2109/34* (2024.01)

(58) Field of Classification Search
None
See application file for complete search history.

(56) References Cited

U.S. PATENT DOCUMENTS

2010/0168942 A1 7/2010 Noffsinger et al.
2023/0195118 A1* 6/2023 Singh ...................... B63B 79/15
701/21
2023/0229832 A1* 7/2023 Matti ...................... G06F 30/15
703/8

OTHER PUBLICATIONS

Chakra, "Exiting the Simulation: The Road to Robust and Resilient Autonomous Vehicles at Scale", Arxiv ID: 2210.10876, Oct. 19, 2022, pp. 1-19 (Year: 2022).*
Reza A. Babakhani; et al.; Application of Neural Network to Find Initial State of Optimization Parameters; Dynamic Systems and Control, Parts A and B, [Online]; Jan. 1, 2006; 8 Pages.
Abdelali Kamil; et al; "A comparative analysis of methods related to automatic ship berthing"; 2019 5th International Conference on Optimization and Applications (ICOA); Apr. 25, 2019; 4 Pages.
Wen Ying; et al.; "Solving the Initial Value Problem of Ordinary Differential Equations by Lie Group based Neural Network Method"; Arxiv.Org, Cornell University Library, 201 Olin Library Cornell University Ithaca, NY; Mar. 7, 2022; 20 Pages.
Extended European Search Report; Application No. 23154923.9; Completed Jun. 7, 2023; Mailing Date: Jun. 19, 2023; 12 Pages.

* cited by examiner

*Primary Examiner* — Tamara L Weber
(74) *Attorney, Agent, or Firm* — Whitmyer IP Group LLC

(57) ABSTRACT

A computer-implemented method for generating control parameters for auto-docking of a marine vessel, and to a control unit for executing the method, to a marine vessel including the control unit, and to a corresponding computer program product.

13 Claims, 5 Drawing Sheets

Providing a machine learning model — S102

Providing an optimization function — S104

Retrieving, from a computer interface, a start position and an end position and locations of obstacles between start and end positions — S106

Processing the start position and end position, and locations of obstacles, in the machine learning model — S108

Determining output control commands — S110

Providing output control commands and an output collision-free path — S112

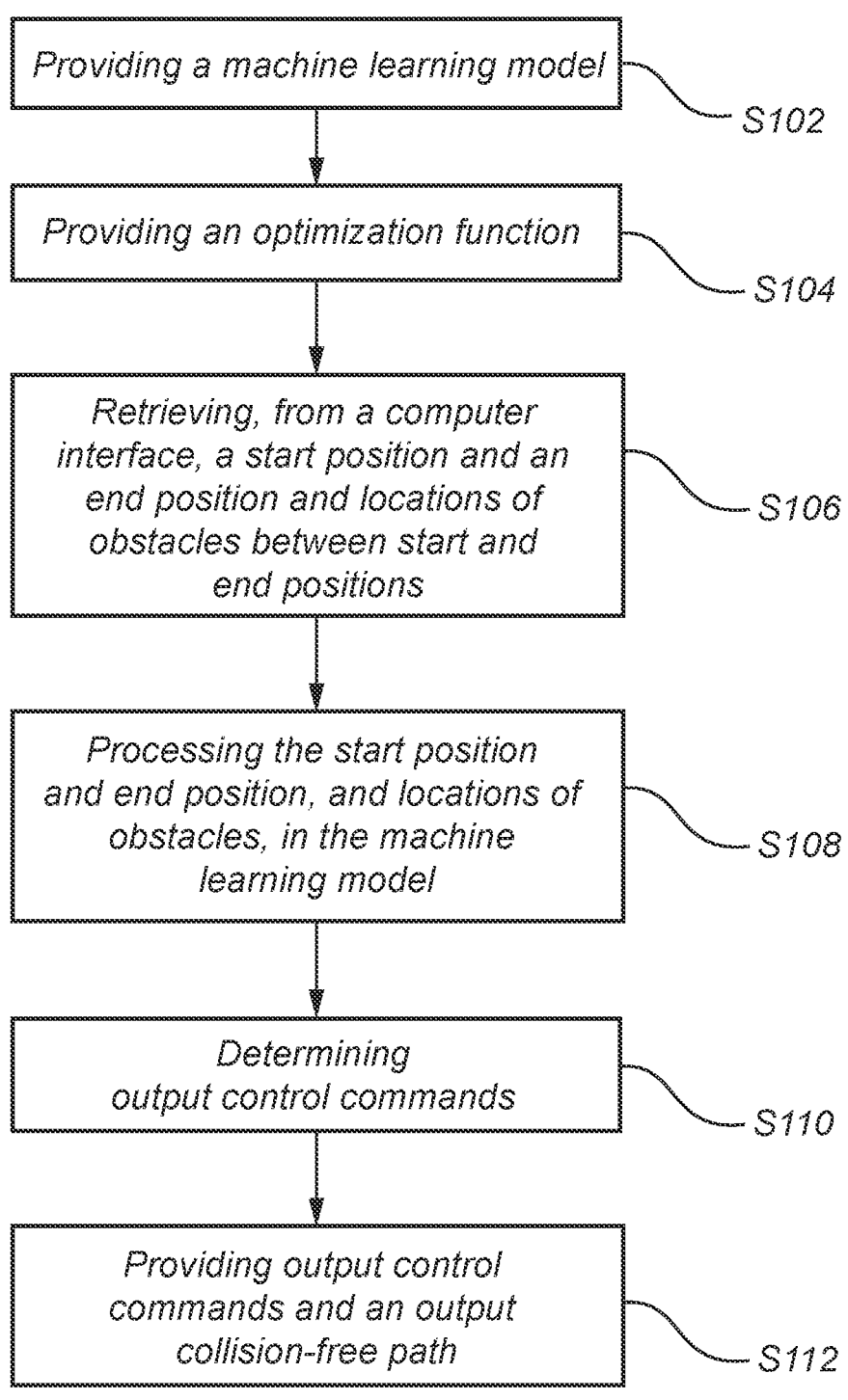

*Providing a machine learning model* — S102

*Providing an optimization function* — S104

*Retrieving, from a computer interface, a start position and an end position and locations of obstacles between start and end positions* — S106

*Processing the start position and end position, and locations of obstacles, in the machine learning model* — S108

*Determining output control commands* — S110

*Providing output control commands and an output collision-free path* — S112

| | $x$ | $y$ | $\varphi$ | $u$ | $v$ | $r$ | $F_x$ | $F_y$ | $M_r$ | $rpm_1$ | $\alpha_1$ | $rpm_2$ | $\alpha_2$ | $V_w$ | $\theta_w$ | $ox_1$ | $oy_1$ | $do_1$ | $ox_2$ | $oy_2$ | $do_2$ | $time$ |
|---|---|---|---|---|---|---|---|---|---|---|---|---|---|---|---|---|---|---|---|---|---|---|
| 1 | | | | | | | | | | | | | | | | | | | | | | |
| 2 | | | | | | | | | | | | | | | | | | | | | | |
| 3 | | | | | | | | | | | | | | | | | | | | | | |
| --------- | ------- | ------- | ------- | ------- | ------- | ------- | ------- | ------- | ------- | ------- | ------- | ------- | ------- | ------- | ------- | ------- | ------- | ------- | ------- | ------- | ------- | ------- |
| 9999 | | | | | | | | | | | | | | | | | | | | | | |
| 10000 | | | | | | | | | | | | | | | | | | | | | | |

Fig. 5

AUTO-DOCKING OF MARINE VESSELS

TECHNICAL FIELD

The present invention generally relates to a computer-implemented method for generating control parameters for auto-docking of a marine vessel, and to a control unit for executing the method, to a marine vessel comprising the control unit, and to a corresponding computer program product.

BACKGROUND

Docking with marine vessels in a port is efficiently performed by human pilots. However, there is a desire to allow auto-docking control systems to perform the docking process in place of human pilots. However, solutions for auto-docking are too slow compared to experienced human pilots.

Accordingly, there is room for improvement with regards solutions for auto-docking of marine vessels.

SUMMARY

In view of the above-mentioned and other drawbacks of the prior art, it is an object of the present invention to provide a method for auto-docking of marine vessels that at least partly alleviates the drawbacks of prior art.

According to a first aspect of the invention, there is provided a computer-implemented method for generating control parameters for auto-docking of a marine vessel from an initial state including a start position, to a final state including an end position, within a target total time, the method comprising: providing a machine learning model configured to predict an initial guess of a set of control parameters and a collision-free path for a marine vessel; providing an optimization function that describes the total time and energy consumption as a function of control parameters for docking a marine vessel from an initial state to a final state, provided constraints on starting point, ending point, and marine vessel dynamics during maneuvering, retrieving, from a computer interface, a start position and an end position for a present auto-docking process for a marine vessel, and locations of obstacles between start and end positions, processing the start position and end position, and locations of obstacles, in the machine learning model to generate an initial guess set of control parameters and collision-free path; determining output control parameters by minimizing the optimization function using the initial guess set of control parameters and the collision free path as starting input to minimizing the total time and energy consumption for auto-docking the marine vessel, and providing output control parameters and an output collision-free path extracted from the minimization of the optimization function to an auto-docking system of the marine vessel to control the maneuvering of the marine vessel to perform an auto-docking process.

The present invention is at least partly based on the realization to employ a machine learning model for providing an accurate initial guess for the optimization function. By providing an accurate initial guess to the optimization function, the time for solving the optimization function is reduced, and the accuracy of the output therefrom is improved.

The machine learning model is trained on datasets including prior control parameters provided by human operators made for docking a marine vessel from a starting point to an end point. This provides for an accurate initial guess based on control parameters used by experienced human pilots.

The datasets of prior control parameters are generated off-line in a simulator mimicking a real marine vessel used by human pilots in different environments, e.g., at different ports, scenarios, and in different environmental conditions. This data is used as input to train the machine learning model. By inputting the start position, end position, and positions of obstacles to the machine learning model, for the present scenario, the machine learning model provides an initial guess set of control parameters and an initial guess for a collision-free path that can be used in solving the optimization function.

The machine learning model may be a supervised learning model employing polygonal regression.

Preferably, the machine learning model may be a multi-output regression model. Unlike normal regression where a single value is predicted for each sample of data, multi-output regression requires specialized machine learning algorithms that support two or more outputs for each data point and the outputs are required simultaneously. In embodiments herein, the control parameter is a vector including a number of decision variables which should be calculated simultaneously. Thus, the machine learning model is advantageously a Multi-output Regression model. There are several algorithms for solving Multi-output Regression problems, for example, (i) Multi-output support vector regression, (ii) Multi-target regression trees, (iii) Multioutput Regression Neural Network.

Each of these algorithms are suitable for embodiments of the present invention. If the data set is of medium size, multi-output support vector regression may have higher performance in terms of better generalization and lower computational time. For larger data sets Multioutput Regression Neural Network may have a higher performance, again in terms of better generalization.

A further possible machine learning model includes Partial Least Squares (PLS) regression models. One advantageous characteristic of PLS is that it employs the Principal Component Analysis (PCA) space in the same way as in Principal Component Regression method (PCR) but here one optimizes the covariance with system output. Meaning that whilst the PCA identifies for the direction of highest variance in dataset X, the PLS regression coefficients are defined in the direction of highest covariance between input and multi-output. PLSR can handle medium to large size of data set.

It may be possible to generate a pipe-line of these three possible machine learning algorithms and test the performance of all of them. Then, using cross-validation, determining which one should be used. Parameters for the algorithms may be optimized during cross-validation.

In embodiments, the method may comprise maneuvering the marine vessel from the start position to the end position using the output control parameters to control thrusters of the marine vessel. Thus, the output control parameters are provided to an auto-docking system of the marine vessel to vary the power of thrusters of the marine vessel according to the output control parameters.

In embodiments, the method may comprise, in a prior offline session, retrieving datasets including prior control parameters provided by human operators made for docking a marine vessel from a starting point to an end point; training the machine learning model on the datasets to mimic control parameters made by a human operator; and deploying the trained machine learning model in a marine vessel auto-docking system. The datasets are preferably generated in a marine vessel simulator that can simulate various operation situations for a marine vessel for training of operators or pilots. The trained machine learning model may be stored on a non-volatile memory device accessible to control units of the marine vessel.

In embodiments, the state variables of the optimization function may include position of the marine vessel in the earth frame, heading angle, surge and sway velocities, and yaw rate. Including further state variables provides for improving the accuracy of the output further.

In embodiments, the output control parameters may comprise required yaw torque and total forces in surge and sway directions. The output control parameters are convertible to operational parameters of the marine vessel thrusters including revolutions per minute and angle of attack using a thruster allocation matrix.

In embodiments, the method may be performed for each time step during an auto-docking process to update the output control parameters for each time step. In other words, the method is continuously performed so that the output control parameters are updated to further improve the auto-docking process.

In embodiments, a repetition rate for the method is based on the size of the marine vessel. For example, for relatively smaller marine vessels, the repetition rate is in the range of 5-10 Hz and for relatively larger marine vessels, the repetition rate is in the range of 0.2-1 Hz.

In embodiments, the target total time is based on a total time required for manual docking by an operator. The target total time (T) may be used as a constraint when minimizing the optimization function, or the target total time may be an output of the optimization function as a decision variable. The generated collision-free path and control parameters are determined so that the deviation from target total time may be minimized according to the capability of the marine vessel and its propulsion system.

In embodiments, the optimization function may include environmental disturbance parameters including at least one of present wind speed, waves, and local sea current speed and direction. In other words, the method may take into account environmental disturbances and counter-act, or take advantage of the environmental disturbances to reduce power consumption.

Furthermore, the environmental disturbance parameters may include a user supplied safety margin from present conditions to handle micro-scale weather variations such as funnel effects around other marine vessels, quay buildings etc.

In addition, a given safety marginal may be added in the optimization where only a reduced thrust allocation is allowed, for example only up to 90% of maximum thrust is allowed to provide a safety margin.

In embodiments, data of the marine vessel dynamics during maneuvering may be pre-stored on a memory device. This provides for fast access to the data.

In embodiments, the optimization function may be non-linear and non-convex.

In embodiments, the machine learning model may be accessed from a server of a cloud-based service, or from a local non-volatile memory device.

According to a second aspect of the invention, there is provided a control unit configured to perform the steps of any one of the embodiments of the first aspect.

Further effects and features of the second aspect of the invention are largely analogous to those described above in connection with the first aspect of the invention.

There is further provided a marine vessel comprising the control unit. According to a third aspect of the invention, there is provided a computer program product comprising program code for generating control parameters for auto-docking of a marine vessel from an initial state including a start position, to a final state including an end position within a target total time, the program code comprising: code for providing a machine learning model configured to predict an initial guess a set of control parameters (U0) and a collision-free path (Path0) for a marine vessel; code for providing an optimization function that describes the total time and energy consumption as a function of control parameters for docking a marine vessel from an initial state to a final state, provided constraints on starting point, ending point, and marine vessel dynamics during maneuvering, code for retrieving, from a computer interface, a start position and an end position for a present auto-docking process for a marine vessel, and locations of obstacles between start and end positions, code for processing the start position and end position, and locations of obstacles, in the machine learning model to generate an initial guess set of control parameters and collision-free path; code for determining output control parameters by minimizing the optimization function using the initial guess set of control parameters and the collision free path as starting input to minimizing the total time and energy consumption for auto-docking the marine vessel, and code for providing output control parameters and an output collision-free path extracted from the minimization of the optimization function to an auto-docking system of the marine vessel to control the maneuvering of the marine vessel to perform an auto-docking process.

Further effects and features of the third aspect of the invention are largely analogous to those described above in connection with the first aspect and the second aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein:

FIG. 2 is a flow-chart of method steps according to embodiments of the present invention;

DETAILED DESCRIPTION

In the present detailed description, various embodiments of the present invention are herein described with reference to specific implementations. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the scope of the invention.

Figure 1:
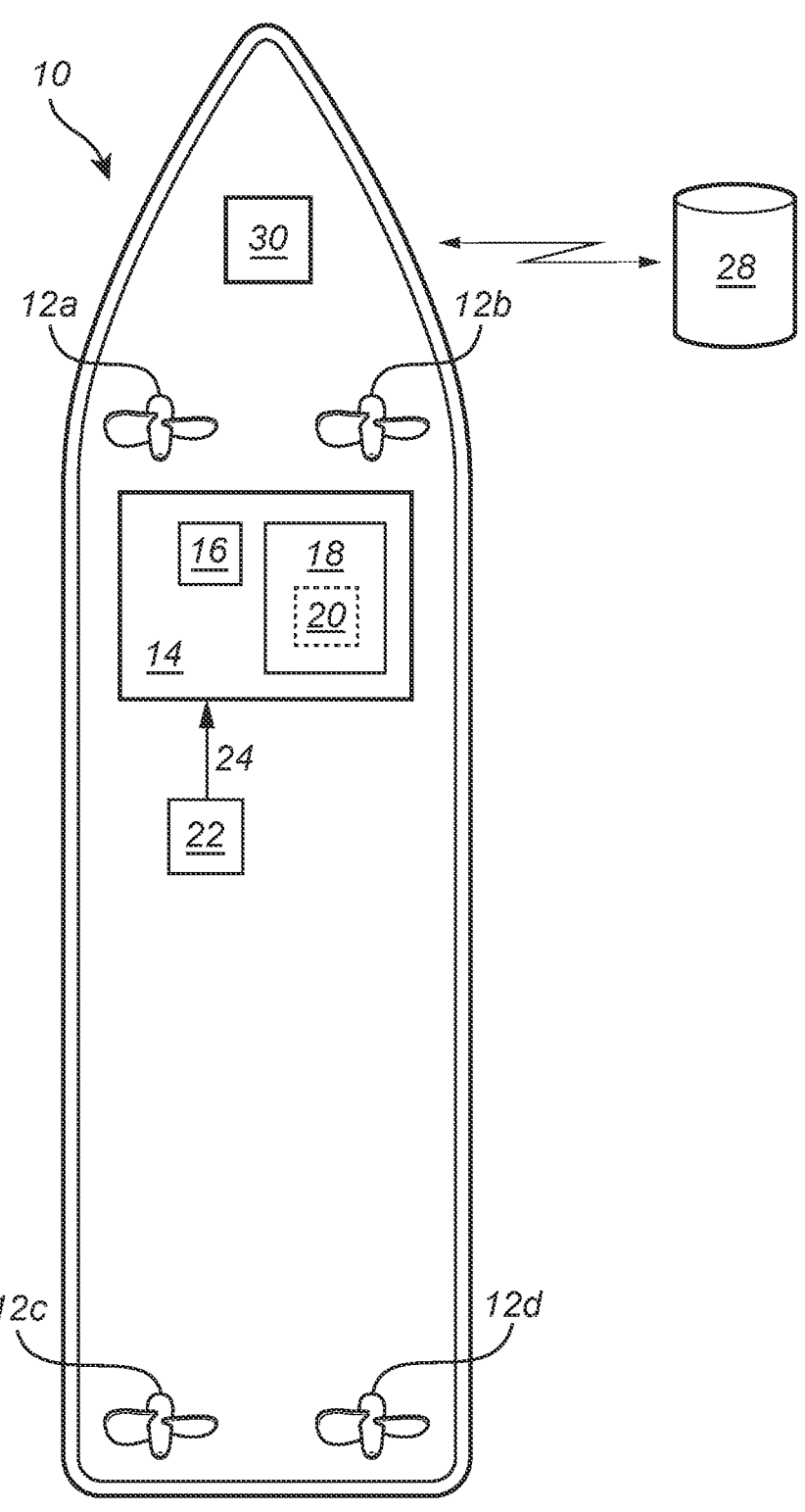
FIG. 1 schematically illustrates a marine vessel according to an embodiment of the invention.

FIG. 1 schematically represents a top view of a marine vessel 10. The marine vessel 10 may for example be a ship or a floating production storage and offloading (FPSO) unit. The vessel 10 comprises a plurality of thrusters, here a first thruster 12*a*, a second thruster 12*b*, a third thruster 12*c* and a fourth thruster 12*d*. One, several or all of the thrusters 12*a*-12*d* may also be referred to with reference numeral "12".

Each thruster 12 is rotatable in a horizontal plane (parallel with the drawing plane of FIG. 1) into different thrust directions. Each thruster 12 may comprise a propeller and an engine driving the propeller. By increasing an engine speed of the engine, the thrust force of the thruster 12 can be increased, and vice versa. The thrusters 12 are here exemplified as azimuthing thrusters.

The vessel 10 further comprises a control system 14. The control system 14 of this example comprises a control unit 16 and a memory 18. The memory 18 has a computer program stored thereon. The computer program comprises program code which, when executed by the control unit 16, causes the data processing device, or control unit, 16 to perform, or command performance of, various steps described herein.

As shown in FIG. 1, a model 20 of the vessel 10 is stored in the memory 18. The model 20 may for example be a nonlinear model of the vessel 10 describing the motion of the vessel 10 in the horizontal plane.

The vessel 10 of this example further comprises one or more sensors, here exemplified as a position sensor 22. The position sensor 22 is arranged to provide position data 24 to the control system 14. The position data 24 is indicative of a position of the vessel 10 in the horizontal plane. The position sensor 22 may for example be a GPS device further providing map data to the control system 14. In this example, the control system 14 is configured to estimate a state variable of the vessel 10 based on the position data 24. The vessel 10 may use a wide range of sensors alternative to, or in addition to, the position sensor 22 to provide sensor data based on which the control system 14 can estimate the state variables of the vessel 10.

When docking a marine vessel 10 in a port using auto-docking where the control system 14 controls the thrusters 12 to propel the marine vessel from its starting position to an end position, or docking position, it is desirable that the docking procedure is safe and not too slow. To improve auto-docking for marine vessels, embodiments herein propose using a machine learning model for providing an initial guess to an optimization function that calculates the control parameters for the thrusters and a collision free path for the marine vessel. In this way, a more efficient process for controlling the marine vessel is provided. The machine learning model is preferably trained on datasets including prior control parameters provided by human operators made for docking a marine vessel from a starting point to an end point.

Figure 3:
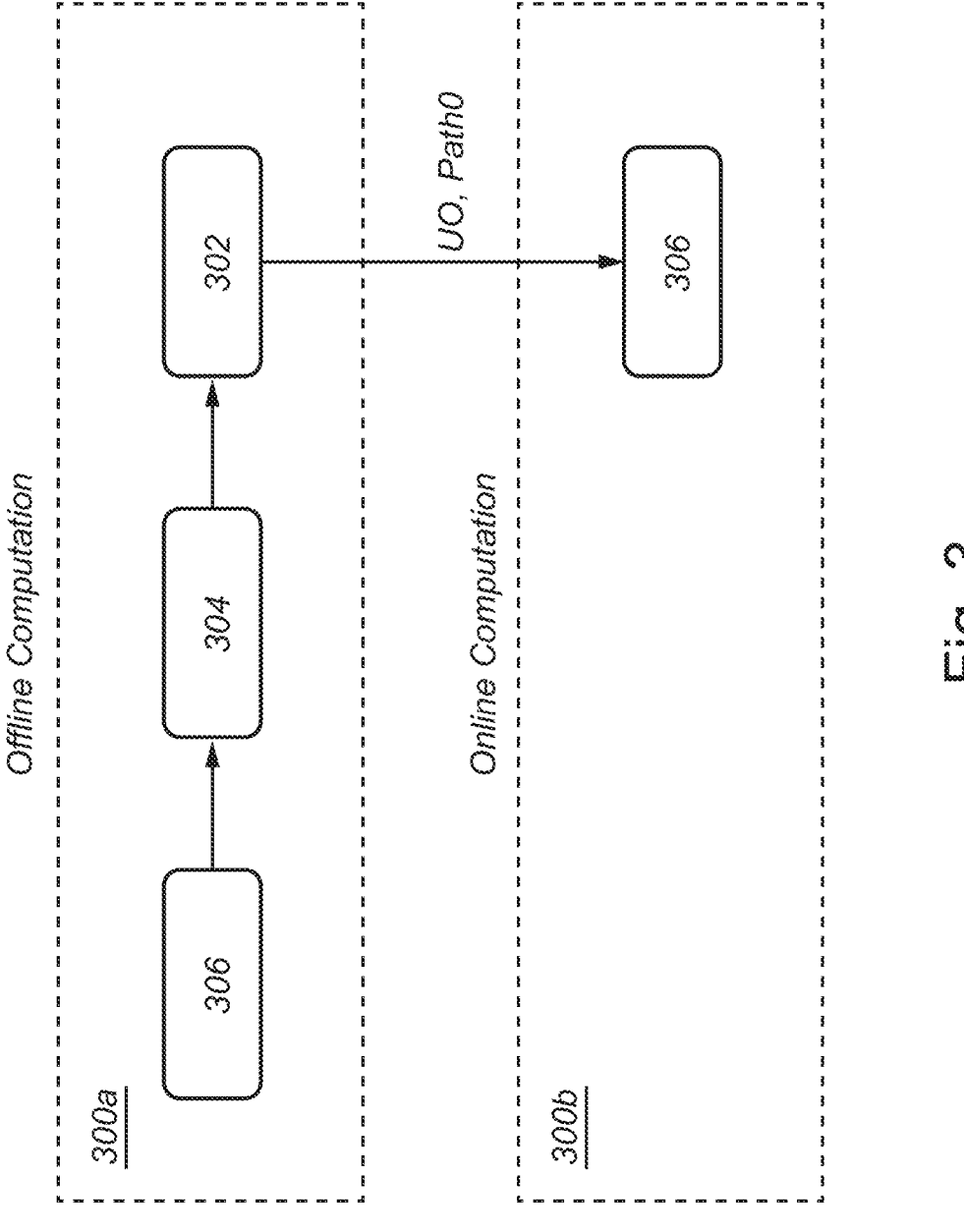
FIG. 3 is a functional block-diagram according to embodiments of the present invention.
Figure 4:
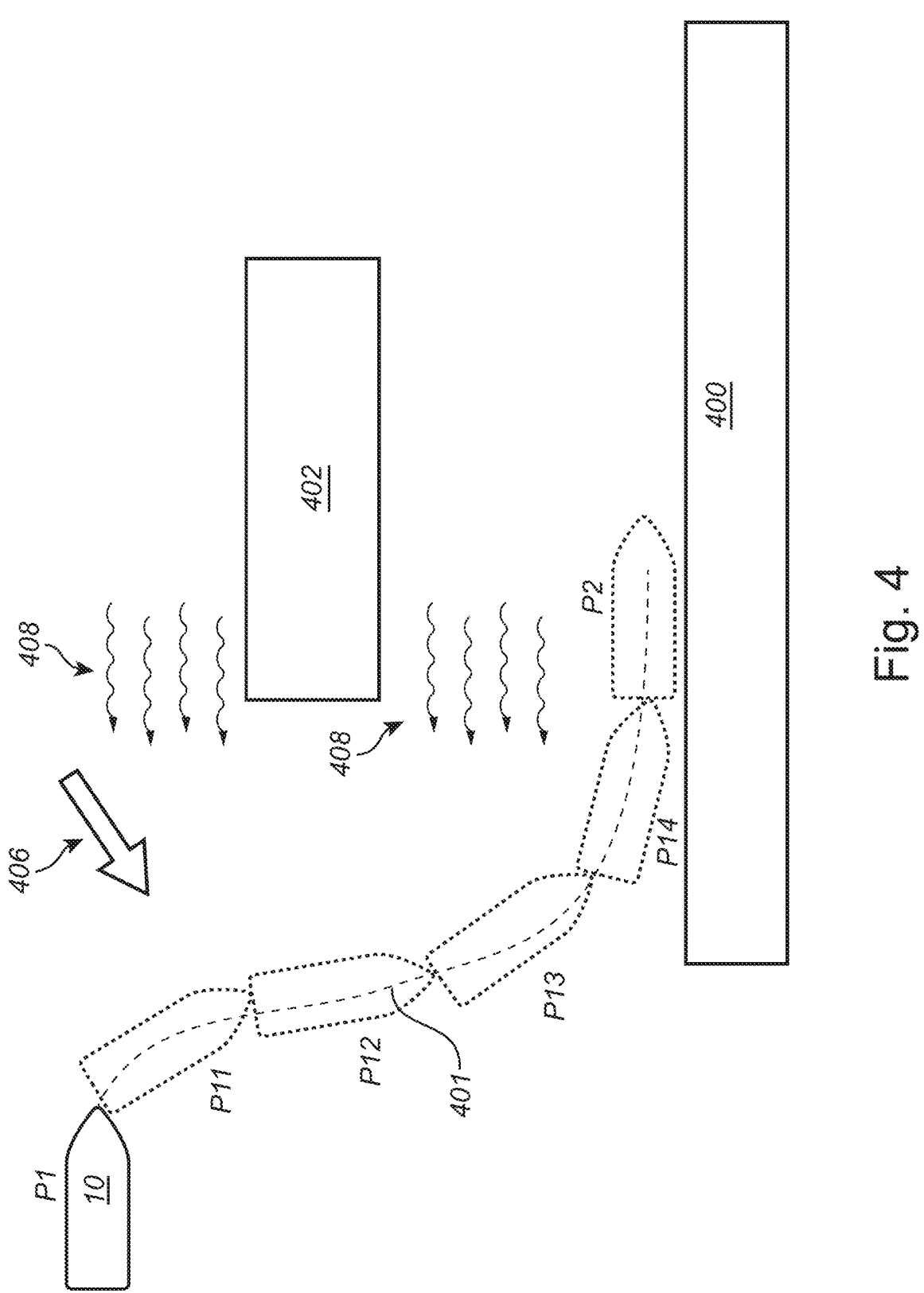
FIG. 4 schematically illustrates docking of a marine vessel according to embodiments of the present invention.

FIG. 2 is a flow-chart of method steps according to embodiments of the invention. FIG. 3 is a functional block-diagram and a FIG. 4 schematically illustrates docking of a marine vessel 10. FIG. 2-4 will be described in conjunction.

The computer-implemented is for generating control parameters, for auto-docking of a marine vessel 10 from an initial state x0 including a start position P1, to a final state xf including an end position P2 within a target total time T.

The start position, P1, may be determined by the position sensor 22 of the marine vessel 10.

In step S102 of the flow-chart of FIG. 2, providing a machine learning model 302 configured to predict an initial guess a set of control parameters (U0) and a collision-free path (Path0) for a marine vessel. The machine learning model 302 is preferably trained on datasets 304 including prior control parameters provided by human operators made for docking a marine vessel from a starting point P1 to an end point P2. The end point P2 may be considered a docked position of the marine vessel at a port 400. In other words, the docking process starts at a start position P1 and ends at the end position P2.

FIG. 3 is a block-diagram schematically illustrating embodiments of the invention. Here, an offline computation block 300*a* includes training data generation and training of the machine learning model 302. The machine learning model 302 is employed by the marine vessel control system 14 in the online block 300*b*.

Block 306 represents manual docking procedures performed by human operators. The manual docking procedures may preferably be performed in a simulator capable of simulating different scenarios at different real-world ports to provide training scenarios for human operators. The human operators operate a virtual marine vessel in the simulated scenarios to practice operating the virtual marine vessel. To generate training data for the machine learning model, the control parameters executed by the human operator to control the marine vessel in a simulated scenario, and the resulting path of the marine vessel, as well as other state variables, are recorded. Training data is recorded for each of a plurality of scenarios for each of a set of ports around the world. Thus, data from the training sessions are collected in order to train machine learning models that can imitate the decisions of the experienced pilots for one particular operational task, i.e. docking in different scenarios and environmental situations. The model then will be used and introduced to the existing advanced control loop for auto-docking for providing an initial guess, thereby speeding up the auto-docking process.

In other words, in a prior offline session, datasets are retrieved including prior control parameters provided by human operators made for docking a marine vessel from a starting point to an end point.

A typical session for recording training data may be as follows. A simulator is provided that comprises a display for displaying the simulated scenario to the human operator positioned with access to control devices for controlling simulated thrusters of the virtual marine vessel placed in the simulated scenario. The simulator comprises processing circuitry, computers, etc. for modelling of the simulated scenario including environmental parameters such as wind strength and direction, sea current strength and directions, surge strength and direction, tidal waves etc., and obstacles such as islands, secondary vessels on the sea, port structures, piers, etc. The virtual marine vessel is placed at a start position, and the human operator is instructed to dock the marine vessel at an end position. For this, the human operator controls the thrusters to propel the marine vessel in the simulate scenario to the end position along a path without collisions. The processing circuitry records all the control parameters such as power of the thrusters and angle of attack of the thrusters throughout the docking process. For example, data indicating revolutions per minute of the thrusters is recorded. The control parameters are recorded alongside positions or coordinates of the path, positions of obstacles relative the marine vessel, present environmental parameters. A data set from one session may be a matrix including numerical representations of time-dependent control parameters, the path taken, and the environmental parameters, and obstacle positions. On example vessel simulator is provided by ABBs Integrated Marine Systems Lab (IMS-lab) which may be used to test and train vessel pilots.

FIG. 5 schematically illustrates a possible form of the resulting training data here having 10000 time steps and assuming two obstacles and two thrusters in the vessel simulator. In FIG. 5:

x, y: Position of marine vessel with respect to Earth-frame.

φ: Heading angle of marine vessel with respect to reference in the Earth frame.

u, v: Linear (surge and sway) velocities of marine vessel with respect to body-frame of the vessel.

r: Rate of turn (angular velocity) of marine vessel.

$F_x$: Total surge force generated by propulsion system of marine vessel.

$F_y$: Total sway force generated by propulsion system of marine vessel.

$M_r$: Total Yaw torque generated by propulsion system of marine vessel.

$rpm_1$: Revolution per minute for thruster number one.

$\alpha_1$: Angle of attack for thruster number one.

$rpm_2$: Revolution per minute for thruster number two.

$\alpha_2$: Angle of attack for thruster number two.

Note here that it is assumed that marine vessel has two thrusters. In general, one pair of operational parameters rpm and e for each thruster is added to the data set.

$V_w$: Velocity of wind.

$\theta_w$: Direction angle of wind with respect to Earth-frame.

$ox_1$, $oy_1$: Arrays describing location of static obstacle number one.

$do_1$: Minimum distance of marine vessel from static obstacle number one during maneuvering.

$ox_2$, $oy_2$: Arrays describing location of static obstacle number two during maneuvering.

$do_2$: Minimum distance of marine vessel from static obstacle number two during maneuvering.

Time is the durational time to reach each point of the simulated path from the initial point.

Note here that it is assumed that there are two static obstacles between starting and target points. In general, one pair of ox and oy for each static obstacle is added to the data set.

In a subsequent step, training the machine learning model on the datasets to mimic control parameters caused by a human operator. Thus, data sets 304 from a plurality of manual docking sessions 306 are provided to the machine learning model 302 as training data. Data sets for different ports are provided so that the machine learning model 302 is trained specifically for a set of real-world ports.

The machine learning model 302 is a supervised learning algorithm to produce a function such as a polygonal regression model that can take new initial state and provide output control parameters and path. Other possible machine learning models include support-vector machines, linear regression, decision trees and neural networks as discussed herein.

Next, deploying the trained machine learning model in a marine vessel auto-docking system. The machine learning model 302 may be stored on the memory 18 of the control system 14. However, the machine learning model may equally well be from a server 28 of a cloud-based service using wireless communication technology 30.

In step S104, providing an optimization function that describes the total time and energy consumption as a function of control parameters for docking a marine vessel from an initial state x0 to a final state xf, provided constraints on starting point, ending point, and marine vessel dynamics during maneuvering. The marine vessel dynamics may be described by a mathematical model that models the geometry of the vessel and how it moves through water (see e.g., Kinematic Models for Maneuvering and Seakeeping of Marine Vessels, Perez et al, Modeling, Identification and Control, Vol. 28, No. 1, 2007, pp. 19-30).

A three-degree-of-freedom model that describes the vessel movement only on surface and neglects the roll, pitch, and heave motions is considered sufficient for the docking process. The mathematical model consists of kinematics and kinetics. Kinematics purely considers the geometric aspects of motion, without reference to the forces and torque which generate such motions. Kinematics describes the relation between velocity of the vessel with respect to the body-fixed frame and position with respect to the earth-fixed frame. Kinetics describes the motions of the vessel due to the forces and torques generated by thrusters. Kinetics includes Coriolis and damping forces. Further, the vessel dynamics preferably also includes parameters of the capability of the propulsion system of the vessel such as propulsion power, steering actions, reactivity, etc., Data indicating the marine vessel dynamics during maneuvering may be pre-stored on a memory device 18.

The optimization function may be formulated as an optimal control problem. For this, a state-space formulation, which models both dynamics and kinematics of a marine vessels over time t, is described by the ordinary differential equation:

$$\dot{x}(t) = f(x(t), u(t), w(t))$$

Here, u, is the control parameter input including e.g. the yaw torque and total forces in surge (forwards/backwards direction) and sway (sideways) directions of the marine vessel, w, is the environmental disturbances which may be wind, wave, and sea current, and x is the system state including for example position of the marine vessel in the earth frame, heading angle, surge and sway velocities and yaw rate. With this formulation, the docking process from an initial state x0 to a final state xf may be formulated as the optimization control problem:

$$
\begin{aligned}
\text{Minimize} \quad & J = T + \int_0^T |u(t)|^2 dt \\
\text{Subject to} \quad & x(0) = x0, \\
& x(T) = xf, \\
& \dot{x}(t) = f(x(t), u(t), w(t)), \ t \in [0, T]
\end{aligned}
$$

The first term T of the optimization function J is the total time required for the docking process. One of the main goals of auto-docking is to do the process at least as fast as human operators, in other words, the total time T should preferably be minimized. The total time T may be based on a total time required for manual docking by an operator.

The second term provided as an integral, allows for minimizing the energy consumption during the docking process.

The optimization function is non-linear and non-convex. Typical numerical methods such as interior point methods may be used for solving this optimizing problem. For example, since the formulated optimization problem is continuous with respect to time, a discretization method such as Euler or Runge-Kutta methods may be used to discretize the objective function and constraints. Then, interior-point methods may be used to solve the corresponding optimization problem.

The state variables, x, of the optimization function may include position of the marine vessel in the earth frame, heading angle, surge and sway velocities, and yaw rate of the marine vessel.

The constraints of the optimization problem are starting point, ending point, and ship dynamics during maneuvering.

In step S106, retrieving, from a computer interface, a start position and an end position for a present auto-docking process for a marine vessel, and locations of obstacles between start and end positions. The computer interface may be an input interface where a user may enter start and end positions. The computer interface further includes an interface between a position sensor and the control system 14 from which a start position may be received. Thus, the computer interface is an interface including one or more communication lines via which the control system 14 receives instructions for initiating an auto-docking procedure and the initial state and end state thereof.

For example, the marine vessel 10, depicted in FIG. 4, is initially in a start position P1. This position P1 can be determined by a position sensor 22, or more specifically a GPS of the marine vessel 10. The end position P2 may be retrieved from port data provided from a computer interface. That is, the marine vessel may retrieve position data so that the operators of the marine vessel, or control system thereof, has information on where to dock in the port 400.

In the dock 400, there are further an obstacle 402 which may be a port structure, a pier, an island, a ship dockyard, or other vessels. The location of static obstacles may be retrieved as predetermined data, and locations of moving objects may be determined by object detection sensors such as radar, lidar, cameras, etc.

In step S108, the control unit 16 processes the start position P1 and end position P2, and locations of obstacles 402, in the machine learning model 302 to generate an initial guess set of control parameters U0 and collision-free path Path0.

In step S110, determining, by the control unit 16, output control parameters and collision-free path 401 by minimizing the optimization function J using the initial guess set of control parameters U0 and the collision free path Path0 as starting input to minimize the total time and/or energy consumption for auto-docking the marine vessel. For example, the total time can be a constraint where a desired time T is set, either fixed or within some interval, whereby the optimization function minimizes energy consumption. In some cases, energy consumption may be a constraint and the time T is minimized. In case both time and energy are minimized, multi-objective optimization is performed.

One advantage of the present invention is that the optimization solver starts with a feasible solution given by the initial guess derived from human operators using the machine learning model, and the minimizes the time and fuel consumption. Therefore, the auto-docking solution may be at least as fast as human operators and the fuel consumption is less than for manual maneuvering of the vessel.

The optimization problem described above is solved using numerical methods for solving non-linear and non-convex optimization problems.

In step S112, providing, by the control unit 16, output control parameters and an output collision-free path extracted from the minimization of the optimization function J to an auto-docking system 14 of the marine vessel to control the maneuvering of the marine vessel 10 to perform an auto-docking process.

Turning to FIG. 4, the method is repeated at consecutive time steps during the auto-docking process. That is, starting from position P1, the method is repeated at intermediate positions P11, P12, P13, P14, before the vessel reaches the end position P2. In one possible embodiment, the method is repeated for each time step during an auto-docking process to update the output control parameters and collision-free path 401 for each time step. The repetition rate may be based on the size of the marine vessel. For example, for relatively smaller marine vessels, the repetition rate is in the range of 5-10 Hz and for relatively larger marine vessels, the repetition rate is in the range of 0.2-1 Hz. Thus, larger vessels require less frequent updates due to slower dynamics than smaller vessels.

In a subsequent step, the control system 14 may use the output control parameters and collision-free path to control the thrusters 12 for maneuvering the marine vessel 10 from the start position P1 to the end position P2. The control system 12 may thus convert the output control parameters, u, to operational parameters of the marine vessel thrusters including revolutions per minute and angle of attack using a thruster allocation matrix, transmitted to control circuities of the thrusters 12.

The output control parameter u comprises required total yaw torque and total forces in surge and sway directions as provided by all thrusters. Using mathematical models of the ship dynamics and the propulsion capability of the vessel, the required operational parameters of each of the marine vessel thrusters can be calculated at each time step. Thus, u is related to operational control parameters of the thrusters by a linear function u=B*F. Here, B is the thrust allocation matrix and F includes the force vector for each thruster. Thus, using this linear equation allows us to find the operational parameter for providing a given force according to the force vector for each thruster. This linear equation may be added to the optimization problem.

As mentioned above, the optimization function J includes environmental disturbance parameters w including present wind speed, waves, and local sea current speed and direction. Environmental disturbance parameters may be measured using environment sensors 32 onboard the vessel, or environmental disturbance parameters may be received from weather stations or other sources of environment data off-board the vessel 10. For example, maritime weather data covering many of the world's oceans and seas is shared by number of organizations, such as National Data Buoy Center and Visual Crossing Weather Data Services, for viewing, downloading and accessing via API. Such maritime weather data is sourced from a variety of sea and ocean-based weather observing stations. Typically, these stations are located on buoys, oil platforms and other moored locations throughout the oceans. As a further example, weather data may be retrieved from ABB Ability™ OCTOPUS—Marine Advisory System.

For example, the control unit 16 may conclude that a wind represented by arrow 406 with a determined speed and direction is present, and that a local sea current 408 with measured strength and direction is present in the port 400. These, and other environmental disturbance parameters w are taken into account in the optimization problem, to add or counteract yaw torque and/or force in surge and sway directions of the marine vessel at different positions along the path 401.

Further, a margin to the path 401 may be as a safety measure considering environmental disturbance parameters. Further, as a safety measure, the output from the optimization may be allowed to utilize a reduced thrust of the of maximum thrust, such as for example 90% of the maximum thrust.

The control unit 16 is configured to perform the steps of any one of the preceding claims.

There is further provided a marine vessel 10 comprising the control unit 16.

The computer program product comprises program code for generating control parameters for auto-docking of a marine vessel from an initial state (x0) including a start position, to a final state (xf) including an end position within a target total time (T), the program code comprising: code for providing a machine learning model configured to predict an initial guess a set of control parameters (U0) and a collision-free path (Path0) for a marine vessel; code for providing an optimization function that describes the total time and energy consumption as a function of control parameters for docking a marine vessel from an initial state to a final state, provided constraints on starting point, ending point, and marine vessel dynamics during maneuvering, code for retrieving, from a computer interface, a start position and an end position for a present auto-docking process for a marine vessel, and locations of obstacles between start and end positions, code for processing the start position and end position, and locations of obstacles, in the machine learning model to generate an initial guess set of control parameters and collision-free path; code for determining output control parameters by minimizing the optimization function using the initial guess set of control parameters and the collision free path as starting input to minimizing the total time and energy consumption for auto-docking the marine vessel, and code for providing output control parameters and an output collision-free path extracted from the minimization of the optimization function to an auto-docking system of the marine vessel to control the maneuvering of the marine vessel to perform an auto-docking process.

A control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which correspond to tangible media such as data storage media, or communication media including any media that facilitate the transfer of a computer program from one place to another, e.g., according to a communication protocol. In this manner, computer-readable media generally may correspond to (1) tangible computer-readable storage media which are non-transitory or (2) a communication media such as signal or carrier waves. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer.

Even though the invention has been described with reference to specific exemplifying embodiments thereof, many different alterations, modifications and the like will become apparent for those skilled in the art.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A computer-implemented method for generating control parameters for auto-docking of a marine vessel from an initial state including a start position, to a final state including an end position within a target total time, the method comprising:

in a prior offline session, retrieving datasets including prior control parameters provided by human operators made for docking a marine vessel from a starting point to an end point;

providing a machine learning model configured to predict an initial guess of a set of control parameters and a collision-free path for a marine vessel, the machine learning model being trained on the datasets including the prior control parameters provided by human operators made for docking the marine vessel from the starting point to the end point;

training the machine learning model on the datasets to mimic control parameters made by a human operator;

deploying the trained machine learning model in a marine vessel auto-docking system;

providing an optimization function that describes the total time and energy consumption as a function of control parameters for docking a marine vessel from an initial state to a final state, provided constraints on starting point, ending point, and marine vessel dynamics during maneuvering, retrieving, from a computer interface, a start position and an end position for a present auto-docking process for a marine vessel, and locations of obstacles between start and end positions, processing the start position and end position, and locations of obstacles, in the machine learning model to generate an initial guess set of control parameters and collision-free path;

determining output control parameters by minimizing the optimization function using the initial guess set of control parameters and the collision free path as starting input to minimizing the total time and energy consumption for auto-docking the marine vessel;

providing output control parameters and an output collision-free path extracted from the minimization of the optimization function to an auto-docking system of the marine vessel to control the maneuvering of the marine vessel to perform an auto-docking process; and maneuvering the marine vessel from the start position to the end position using the output control parameters to control thrusters of the marine vessel.

2. The method according to claim 1, wherein the state variables of the optimization function include position of the marine vessel in the earth frame, heading angle, surge and sway velocities, and yaw rate.

3. The method according to claim 1, wherein the output control parameters comprise required yaw torque and total forces in surge and sway directions.

4. The method according to claim 1, wherein the method is performed for each time step during an auto-docking process to update the output control parameters for each time step.

5. The method according to claim 4, wherein a repetition rate for the method is based on the size of the marine vessel.

6. The method according to claim 1, wherein the target total time is based on a total time required for manual docking by an operator.

7. The method according to claim 1, wherein the optimization function includes environmental disturbance parameters including present wind speed, waves, and local sea current speed and direction.

8. The method according to claim 1, wherein data of the marine vessel dynamics during maneuvering is pre-stored on a memory device.

9. The method according to claim 1, wherein the optimization function is non-linear and non-convex.

10. The method according to claim 1, wherein the machine learning model is accessed from a server of a cloud-based service.

11. A control unit configured to perform the steps of a computer-implemented method for generating control parameters for auto-docking of a marine vessel from an initial state including a start position, to a final state including an end position within a target total time, the method including the steps of:

in a prior offline session, retrieving datasets including prior control parameters provided by human operators made for docking a marine vessel from a starting point to an end point;

providing a machine learning model configured to predict an initial guess of a set of control parameters and a collision-free path for a marine vessel, the machine learning model being trained on the datasets including the prior control parameters provided by human operators made for docking the marine vessel from the starting point to the end point;

training the machine learning model on the datasets to mimic control parameters made by a human operator;

deploying the trained machine learning model in a marine vessel auto-docking system;

providing an optimization function that describes the total time and energy consumption as a function of control parameters for docking a marine vessel from an initial state to a final state, provided constraints on starting point, ending point, and marine vessel dynamics during maneuvering, retrieving, from a computer interface, a start position and an end position for a present auto-docking process for a marine vessel, and locations of obstacles between start and end positions, processing the start position and end position, and locations of obstacles, in the machine learning model to generate an initial guess set of control parameters and collision-free path;

determining output control parameters by minimizing the optimization function using the initial guess set of control parameters and the collision free path as starting input to minimizing the total time and energy consumption for auto-docking the marine vessel, providing output control parameters and an output collision-free path extracted from the minimization of the optimization function to an auto-docking system of the marine vessel to control the maneuvering of the marine vessel to perform an auto-docking process; and maneuvering the marine vessel from the start position to the end position using the output control parameters to control thrusters of the marine vessel.

12. A marine vessel comprising a control unit configured to perform the steps of a computer-implemented method for generating control parameters for auto-docking of a marine vessel from an initial state including a start position, to a final state including an end position within a target total time, the method including the steps of:

in a prior offline session, retrieving datasets including prior control parameters provided by human operators made for docking a marine vessel from a starting point to an end point;

providing a machine learning model configured to predict an initial guess of a set of control parameters and a collision-free path for a marine vessel, the machine learning model being trained on the datasets including the prior control parameters provided by human operators made for docking the marine vessel from the starting point to the end point;

training the machine learning model on the datasets to mimic control parameters made by a human operator;

deploying the trained machine learning model in a marine vessel auto-docking system;

providing an optimization function that describes the total time and energy consumption as a function of control parameters for docking a marine vessel from an initial state to a final state, provided constraints on starting point, ending point, and marine vessel dynamics during maneuvering, retrieving, from a computer interface, a start position and an end position for a present auto-docking process for a marine vessel, and locations of obstacles between start and end positions, processing the start position and end position, and locations of obstacles, in the machine learning model to generate an initial guess set of control parameters and collision-free path;

determining output control parameters by minimizing the optimization function using the initial guess set of control parameters and the collision free path as starting input to minimizing the total time and energy consumption for auto-docking the marine vessel;

providing output control parameters and an output collision-free path extracted from the minimization of the optimization function to an auto-docking system of the marine vessel to control the maneuvering of the marine vessel to perform an auto-docking process; and maneuvering the marine vessel from the start position to the end position using the output control parameters to control thrusters of the marine vessel.

13. A computer program product comprising a non-transitory computer-readable medium including program code for generating control parameters for auto-docking of a marine vessel from an initial state including a start position, to a final state including an end position within a target total time, the program code including:

code for retrieving, in a prior offline session, datasets including prior control parameters provided by human operators made for docking a marine vessel from a starting point to an end point;

code for providing a machine learning model configured to predict an initial guess of a set of control parameters and a collision-free path for a marine vessel, the machine learning model being trained on the datasets including the prior control parameters provided by human operators made for docking the marine vessel from the starting point to the end point;

code for training the machine learning model on the datasets to mimic control parameters made by a human operator;

code for deploying the trained machine learning model in a marine vessel auto-docking system;

code for providing an optimization function that describes the total time and energy consumption as a function of control parameters for docking a marine vessel from an initial state to a final state, provided constraints on starting point, ending point, and marine vessel dynamics during maneuvering, code for retrieving, from a computer interface, a start position and an end position for a present auto-docking process for a marine vessel, and locations of obstacles between start and end positions, code for processing the start position and end position, and locations of obstacles, in the machine learning model to generate an initial guess set of control parameters and collision-free path;

code for determining output control parameters by minimizing the optimization function using the initial guess set of control parameters and the collision free path as starting input to minimizing the total time and energy consumption for auto-docking the marine vessel;

code for providing output control parameters and an output collision-free path extracted from the minimization of the optimization function to an auto-docking system of the marine vessel to control the maneuvering of the marine vessel to perform an auto-docking process; and code for maneuvering the marine vessel from the start position to the end position using the output control parameters to control thrusters of the marine vessel.

* * * * *